(12) United States Patent
Peters

(10) Patent No.: US 6,601,093 B1
(45) Date of Patent: Jul. 29, 2003

(54) ADDRESS RESOLUTION IN AD-HOC NETWORKING

(75) Inventor: Marcia L. Peters, Raleigh, NC (US)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 09/452,884

(22) Filed: Dec. 1, 1999

(51) Int. Cl.⁷ .......................................... G06F 15/177
(52) U.S. Cl. ...................................... 709/220; 709/245
(58) Field of Search ........................ 709/2 SS, 220, 709/245, 298

(56) References Cited

U.S. PATENT DOCUMENTS

| | | | | |
|---|---|---|---|---|
| 5,434,974 A | * | 7/1995 | Loucks et al. ............... | 707/101 |
| 5,596,723 A | * | 1/1997 | Romohr ....................... | 709/222 |
| 5,636,216 A | * | 6/1997 | Fox et al. .................... | 370/402 |
| 5,835,725 A | * | 11/1998 | Chiang et al. ............... | 709/228 |
| 5,862,404 A | * | 1/1999 | Onaga ......................... | 709/223 |
| 5,875,183 A | * | 2/1999 | Nitadori ....................... | 370/328 |
| 5,918,016 A | * | 6/1999 | Brewer et al. ............... | 709/220 |
| 6,269,099 B1 | * | 7/2001 | Borella et al. .............. | 370/389 |

* cited by examiner

*Primary Examiner*—David Wiley
*Assistant Examiner*—Phuoc Nguyen (57) ABSTRACT

A method, system, and computer program product for resolving address information in an ad-hoc networking environment. Two indicators are defined to indicate whether (1) a device has a self-assigned (i.e. auto-configured) IP (Internet Protocol) address and (2) the device has an administered IP address (i.e. an IP address configured by an administrator or assigned by a service such as a Dynamic Host Configuration Protocol service). These indicators are communicated, along with a device's IP host name, IP address, subnet, and subnet mask, preferably as augmented information of existing protocol messages. The information may be communicated during establishment of the data link layer connection between two devices, or it may be communicated during service discovery protocol exchanges between two devices, or in a combination thereof.

39 Claims, 3 Drawing Sheets

ADDRESS RESOLUTION IN AD-HOC NETWORKING

BACKGROUND OF THE INVENTION

1. Field of the Invention

The present invention relates to a computer system, and deals more particularly with a method, system, and computer program product for performing address resolution in an ad-hoc networking environment.

2. Description of the Related Art

Ad-hoc networking, whereby small peer-to-peer networks are established without the communicating devices necessarily having a priori knowledge of one another, is becoming increasingly popular. This method of networking is often used for communications between mobile devices, where one mobile device may learn of a second mobile device by detecting the second device's transmission signals when the two devices are located within an appropriate physical proximity of one another. Networks where one or more devices are mobile and another is stationary, networks within small offices, networks in the home, and networks within businesses such as hotels are additional environments where this type of networking is advantageous.

Examples of ad-hoc networking applications involving at least one mobile (i.e. roaming) device include presenting content- and location-sensitive information such as music, voice, or diagrams to a user wandering through a museum exhibit or trade fair kiosk. Or, targeted advertisements for products in a store could be presented as the shopper approaches the product, tailored to the consumer's past buying behavior, age, or other preferences. A highway driver could be notified of traffic jams ahead and given information about detours based on the user's ultimate destination. A user could select a personal "music stream" to be constantly delivered to the user's personal device as the user roams. A student driving through a campus parking lot may establish an ad-hoc connection from his or her mobile computing device to a campus server that maintains information about available parking spaces, such that the driver can be directed toward an available space instead of driving around and around, wasting time and gasoline. Many other such examples can be imagined.

In this type of ad-hoc networking environment, devices often communicate using the Internet Protocol, or "IP". The devices which dynamically attach to an ad-hoc network tend to remain attached for varying lengths of time. Each such device must obtain a network address (such as an IP address), if it has not already been configured with one, in order to participate in network communications. Application programs written for IP networking typically expect to refer to other computing devices using the target device's host name, as opposed to using the target device's IP address. Thus, it is necessary to determine the IP address of a target device (using that device's host name to access a lookup table, for example) before messages can be exchanged between the applications residing on the devices. In conventional networking environments, an address assignment service and/or an address resolution service are typically available for these purposes. A DHCP (Dynamic Host Configuration Protocol) server, e.g., may be contacted by a device that wishes to receive an address assignment. A DNS (Domain Name System) server may be contacted to determine a target device's IP address using its known host name. These services may not be available in the ad-hoc networking environment, however, and therefore alternatives techniques are required.

One alternative way of learning the IP address of a target device is to statically pre-configure that information into each device that may need to communicate with this target device (and/or its resident applications), and then to consult this pre-configured information. This approach, however, is very labor-intensive, tedious, and error prone. In addition, this type of configuration of devices typically requires a skilled network administrator, and is therefore not well suited to environments—such as the in-home networking environment—where these administrator skills are not available. Furthermore, as devices become more portable and therefore are increasingly used in mobile environments, it is not realistic to expect that the static pre-configured information will be sufficient for communicating with the many devices which may be encountered by a roaming device.

If one accepts the premise that any kind of static pre-configuration requirement is therefore unacceptable, and/or that a solution relying on statically pre-configured information is inadequate, then there are several related unresolved problems faced by devices which need to communicate in ad-hoc IP networks. First, a device operating in this environment must choose an IP address even though it is using IP in disconnected mode (i.e. disconnected from a traditional network in which address assignment services are available), in order to participate in communications using IP. Second, a device must have a way of resolving another device's host name to its IP address, in order to communicate with applications operating on that other device. Third, a device must be capable of resolving a target IP address to a Layer 2 connection (i.e. to determine the appropriate interface to be used within a device for communicating with a target device).

A technique for addressing the first of these problems exists in the prior art. The Internet Engineering Task Force (IETF) Draft titled "Automatically Choosing an IP Address in an Ad-Hoc IPv4 Network" describes a technique for automatically choosing an available IP address for oneself from the IANA (Internet Assigned Numbers Authority) reserved "LINKLOCAL" subnet when isolated from normal network services (e.g. for devices operating on a home network that is temporarily disconnected from the Internet). This LINKLOCAL subnet uses addresses in the range from 169.254.1.0 through 169.254.254.255, providing in excess of 65,000 potential address choices. This draft specification states that addresses must be chosen at random from this reserved address range, and further defines techniques for dynamically determining whether a randomly-selected address is indeed available for use. (Refer to Internet location http:/www.ietf.org/internet-drafts/draft-ietf-dhc-ipv4-autoconfig-04.txt for more information on this IETF Draft.) However, this approach has several shortcomings. When a device having an auto-configured IP address connects to a network which has a DHCP server available, it is necessary for the device to cease using its auto-configured address and use a "real" administered address instead. This is necessary because the auto-configured subnetwork (or "subnet") address will be topologically incorrect for communicating with other devices that are connected to the same subnet and which have obtained administered addresses, preventing communication with these devices. In addition, there is currently no convenient trigger that indicates to an auto-configured device that it should release its existing address and obtain an administered address.

Accordingly, what is needed is a technique with which the above-described inadequacies in the current art can be overcome.

SUMMARY OF THE INVENTION

An object of the present invention is to provide a technique for improving address resolution in ad-hoc networking environments.

Another object of the present invention is to provide this technique in a manner that enables a device to communicate its IP address and the source of that address.

Yet another object of the present invention is to provide this technique whereby a device may receive information about other devices' IP addresses and the source of those addresses, and efficiently use this information for communicating with such devices.

Still another object of the present invention is to provide this technique by augmenting an existing service discovery protocol.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for address resolution in an ad-hoc networking environment. In a first aspect, this technique comprises: sending a first service discovery message from a first device to a second device, wherein the first service discovery message is augmented with Internet Protocol (IP) address information and address source indicators pertaining to the first device; receiving the first service discovery message by the second device; storing the IP address information and the address source indicators at the second device; and using the IP address informnation and the address source indicators stored at the second device for communicating from the second device to the first device in the ad-hoc networking environment.

This technique may further comprise: sending a second service discovery message from the second device to the first device, wherein the second service discovery message is augmented with the IP address information and the address source indicators pertaining to the second device; receiving the second service discovery message by the first device; storing the IP address information and the address source indicators at the first device; and using the IP address information and the address source indicators stored at the first device for communicating from the first device to the second device in the ad-hoc networking environment.

The IP address information preferably further comprises an IP host name, an IP address, an IP subnetwork address, and an IP subnetwork mask. The address source indicators preferably comprise a first indicator which indicates whether the IP address was self-assigned and a second indicator which indicates whether the IP address was administratively configured or assigned by an address assignment service.

The technique may further comprise: comparing a remote IP address from the received IP address information to a local IP address of the second device to determine whether the local IP address needs to be changed; and changing, based upon a result of the comparison, the local IP address.

The first and second service discovery messages may be Bluetooth Service Discovery Protocol messages, Service Location Protocol messages, or Simple Service Discovery Protocol messages.

In another aspect, this technique comprises: sending an inquiry message from a first device to a second device; receiving the inquiry message by the second device; sending an inquiry response message from the second device to the first device, wherein the inquiry response message is augmented with address source indicators pertaining to the second device; receiving the inquiry response message by the first device; sending IP address information from the second device to the first device; receiving the IP address information by the first device; storing the address source indicators at the first device; storing the IP address information at the first device; and using the IP address information and the address source indicators stored at the first device for communicating from the first device to the second device in the ad-hoc networking environment.

In this aspect, the IP address information preferably comprises an IP host name, an IP address, an IP subnetwork address, and an IP subnetwork mask, and the address source indicators preferably comprise a first indicator which indicates whether the IP address was self-assigned and a second indicator which indicates whether the IP address was administratively configured or assigned by an address assignment service. The IP address information may be communicated in the inquiry response message, or it may be communicated in a message distinct from the inquiry response message.

The present invention will now be described with reference to the following drawings, in which like reference numbers denote the same element throughout.

DESCRIPTION OF THE PREFERRED EMBODIMENTS

Figure 1:
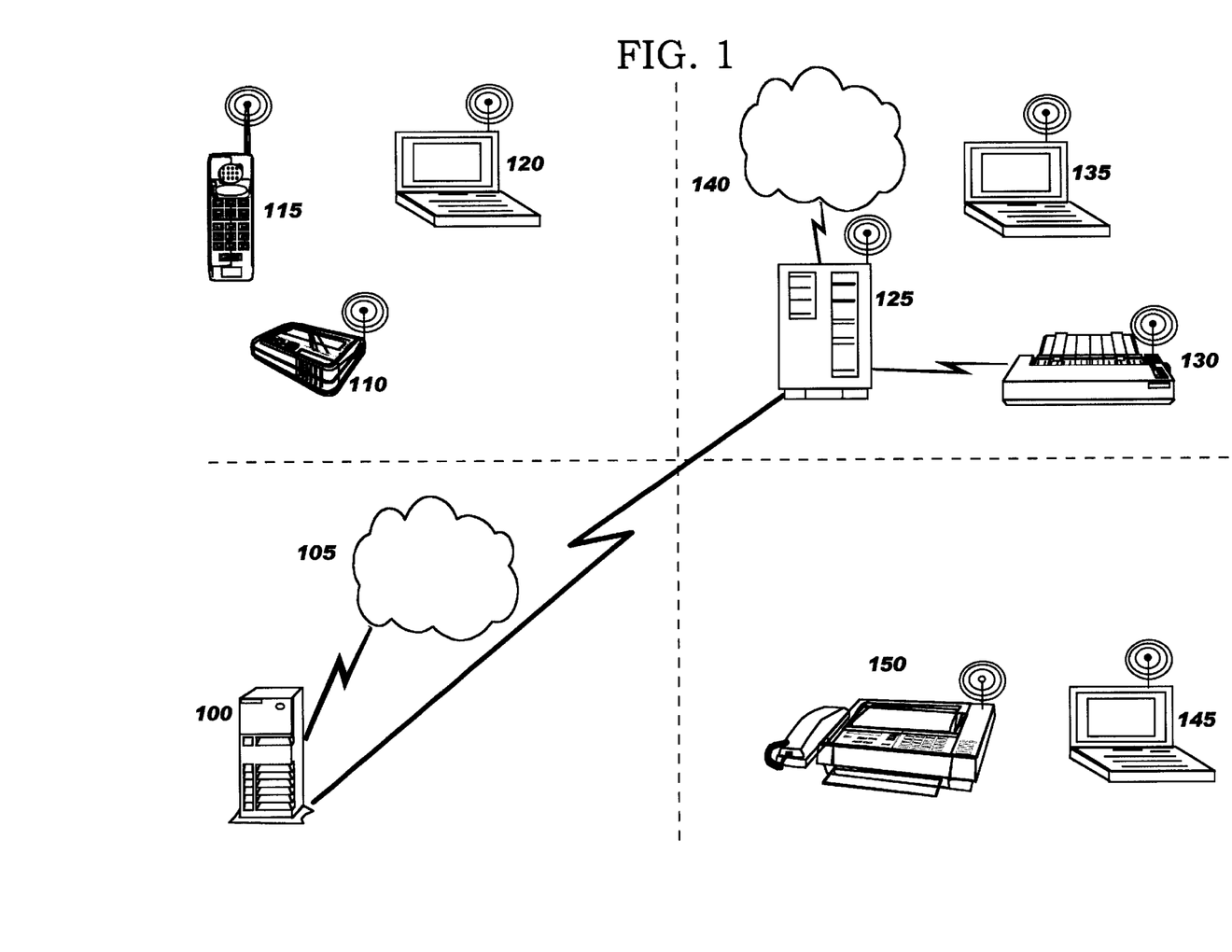
FIG. 1 depicts a subset of a sample network in which the present invention may be used.

FIG. 1 illustrates a sample network computing environment in which the present invention may be practiced. A server 100 is connected to a typical enterprise LAN 105. A second server 125 is connected to the first server 100 over a WAN and is also connected conventionally to a LAN 140. Wireless devices such as a wireless notebook computer 135 can connect with a wireless access point on the server 125. The wireless device can also send information over the air waves to a printer 130 directly (rather than transmitting the information to the server 125 and having the server use a conventional wire line connection to transmit the information to the printer 130). Wireless computer 135 may be a roaming device, which establishes communications with server 125 upon coming into proximity of the electromagnetic signal.

Another scenario depicted in FIG. 1 includes a wireless notebook computer 120, a cellular telephone 115, and a pager 110. In this scenario, all three devices could communicate such that the telephone 115 or pager 110 could send messages to the notebook computer 120 for logging on the disk of the notebook computer 120. A realistic example of this in the business world might be where someone is in a meeting and awaiting the arrival of some urgent electronic mail (e-mail). The system could be set up such that when new e-mail arrived at the notebook computer 120 (either over a cellular modem or over a LAN attached to the notebook computer via a piconet), the subject or sender of the e-mail would be sent from the notebook computer 120 to the pager 110 over the piconet, causing the pager to vibrate and display the message. Alternatively, the computer 120 could dial the wireless telephone 115 and, using a text-to-speech function, read aloud from an urgent e-mail.

Another useful scenario depicted in FIG. 1 might be where a facsimile machine 150 had a wireless connection to a notebook computer 145 such that the user of the notebook could utilize the underlying telephone network attached to the fax machine 150 to send information to others without having to plug and unplug cables from the mobile computer 145, or to access a server which has a connection to this telephone network. The connection would be made wirelessly directly between the notebook computer 145 and the facsimile machine 150. Yet another useful scenario is where a cable modem or asymmetric digital subscriber line (ADSL) adapter in the home is provided with a wireless transceiver, such that all types of devices in the home— including personal computers, telephone handsets, television receivers, video recorders, audio speakers, and audio recorders—can access the wire line network by means of a wireless connection. This offers a great convenience to users in that devices can easily be added or moved without the inconvenience and expense of cables or in-premises wiring. It is also desirable from the manufacturer or service provider's point of view, since it allows for the consolidation of multiple services in a single physical access device.

Note that while the present invention is described in terms of wireless connections between mobile devices and servers, this is for purposes of illustration and not of limitation. The inventive techniques described herein may be applicable to stationary devices as well, and/or to connections using wire line access.

The present invention discloses a technique for enabling existing IP applications to work between devices which are communicating in ad-hoc networking environments. Specifically, the present invention teaches defining two variable or flag settings, indicating the source of a device's current IP address (i.e. a first flag indicating whether the address was self-assigned, such as using the previously described LINKLOCAL technique, and a second flag indicating whether the address was administratively configured or assigned by an address assignment service such as a DHCP service). This information, as well as additional information related to a device's IP address, may be exchanged during a service discovery process or during a layer 2 (i.e. data link layer) connection establishment process. The information to be exchanged according to the present invention preferably comprises: (1) the settings indicating the IP address source, referred to hereinafter as the Self-Assigned Address ("SAA") and the Administered Address ("AA") indicators; (2) a variable-length IP host name field (to convey the name with which this device is associated); (3) an IP address field, preferably capable of representing either an IPv4 or an IPv6 address; and (4) an IP subnet field, including a subnet mask. The two address indicators are then used by the message recipient to interpret the IP address field, in order to know whether this is a self-assigned address (referred to equivalently herein as an auto-configured address) or a "real" address configured by an administrator or assigned by an address service.

When communicating the augmented information of the present invention during service 1X discovery, the service discovery process of an existing protocol is preferably used, such as the Bluetooth Service Discovery Protocol ("SDP"), where the messages exchanged according to the existing protocol are augmented with additional information according to the present invention. Alternative protocols include the Service Location Protocol ("SLP") and the Simple Service Discovery Protocol ("SSDP"). (The Bluetooth SDP specification may be found on the Web at location http://www.bluetooth.com/link/spec/bluetooth_e.pdf, titled "Bluetooth Specification Version 1.0 A, Service Discovery Protocol". For more information on SLP, refer to RFC (Request for Comments) 2608 from the IETF, titled "Service Location Protocol, Version 2". For more information on SSDP, refer to "Simple Service Discovery Protocol/1.0", which may be found on the Web at location http://search.ietf.org/internet-drafts/draft-cai-ssdp-v1-02.txt.)

Service discovery protocols enable a device to discover what services are available in a network. The SLP, SSDP, and Bluetooth SDP protocols are examples. These service discovery techniques are especially well-suited to the ad-hoc networking environment. As an example of using service discovery, suppose a device needs to print information but does not have its own print capabilities. A service discovery protocol may be used to determine whether a printer is available in the network to which the device is connected. This eliminates the need to statically configure the device with a target printer host name and location.

When communicating the augmented information of the present invention during layer 2 establishment, the Bluetooth Inquiry_Response message is preferably used, where this message is augmented with additional information (and possibly an additional message is used) according to the present invention. When establishing a layer 2 connection using the Bluetooth L2CAP (Logical Link Control and Adaptation) protocol, a device sends an Inquiry message. Devices detecting this message may respond with an Inquiry Response message which contains, inter alia, a 3-byte "Class of Service/Class of Device" (hereinafter, "COS/COD") field. This field may be used to convey the flag settings of the present invention. If this field can be extended beyond 3 bytes, the additional information (described above) used by the present invention may also be conveyed in this Inquiry_Reponse message. Otherwise, if the field length is fixed at 3 bytes, then the remaining additional information may be conveyed after establishment of the layer 2 connection, for example during the service discovery protocol flows, or perhaps by defining another layer 2 message to be transmitted for the additional information. Information on the Bluetooth inquiry procedures may be found in the Baseband portion of the Bluetooth specification at http://www.bluetooth.com/link/spec/bluetooth_b.pdf in section 10.7 thereof.

"Bluetooth" is a recently-developed technique that enables devices containing radio modems to be automatically detected upon coming into radio proximity with one or more other similarly-equipped devices. Devices incorporating this technique are referred to as "Bluetooth-enabled" devices. A standard defining the Bluetooth techniques may be found on the Web at location http://www.bluetooth.com. Small, physically proximate networks of Bluetooth-enabled devices may be established using radio communications according to the Bluetooth protocols defined in the aforementioned standard, where these networks are referred to as "piconets" or "picocells". A Bluetooth-enabled mobile device may also connect to a local area network (LAN) or wide-area network (WAN), using the mobile device to communicate with a second Bluetooth-equipped device that serves as an access point into that network. The low-powered radio module defined by the Bluetooth standard is intended to be built into mobile computers, mobile phones, printers, facsimile machines, modems, network interfaces (such as LAN or WAN connections), digital cameras, pagers, headphones, etc. It is anticipated that the popularity of using these types of device will increase rapidly in the near future. Because many of these devices will be highly portable, they are good candidates for use by a roaming mobile user in the example scenarios discussed previously, and thus will benefit from the address resolution techniques disclosed herein.

Infrared technology is another technique gaining wide acceptance for communicating among mobile devices. Current infrared technology requires line-of-sight proximity but supports data rates of up to 20 Megabits per second. Infrared also supports "automatic device discovery", and the latest so-called "Advanced Infrared" technology uses a wider beam angle to make it less directional. Many of the latest "smartphones" from companies such as Nokia, Ericsson, .and Motorola also have infrared support. Devices such as the Palm Computing PalmPilot, IBM WorkPad®, and IBM Think Pad® also support infrared technology. ("WorkPad" and "Think Pad" are registered trademarks of IBM.) Thus, the techniques of the present invention may also be used advantageously for devices communicating via infrared.

When using layer 2 establishment to convey the address indicators of the present invention, the device will determine whether it has a self-assigned address, an administered address, or no known IP address before sending an Inquiry Response message, and set the indicator bits (described above as part of the 3-byte COS/COD field) accordingly. Upon receiving an Inquiry_Response message from another device, the indicator bits are extracted and may be stored in a local address table (such as an Address Resolution Protocol or "ARP" table, or routing table, or a "hosts" file or similar data structure) along with the other device's communicated addressing information. As described above, if the 3-byte field is to be extended, then the device's IP host name, IP address, subnet, and subnet mask (if available) are also set and transmitted by a device responding to an Inquiry message with an Inquiry_Response, and are extracted from the Inquiry_Response message by a receiving device and stored in that receiving device's local address table. Or, if the 3-byte field is not extended, then the device's IP host name, IP address, subnet, and subnet mask are set and transmitted in an alternative message and extracted therefrom by message receivers.

The manner in which the preferred embodiment of the present invention is implemented when using service discovery techniques will now be described in more detail with reference to FIGS. 2 and 3.

Figure 2:
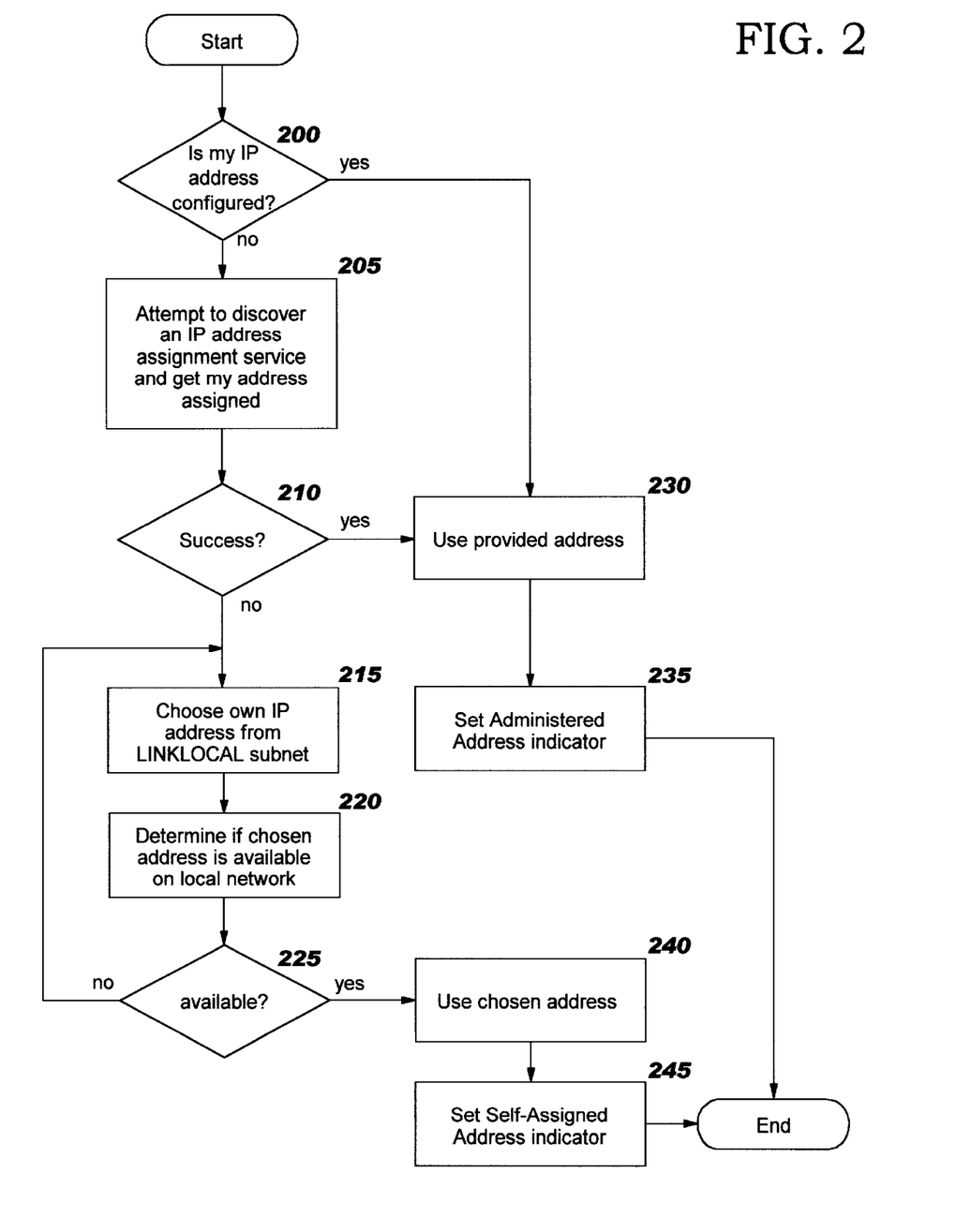
FIG. 2 illustrates the preferred embodiment of the logic executed at a wireless device that needs an IP address for itself.

The processing of FIG. 2 is executed when a device determines that it needs an IP address, for example when an IP application makes an "open socket" call in preparation for sending data or listening for data. Block 200 tests whether the device has a locally-configured IP address. If so, then control transfers to Block 230 where the device will use the provided address. Otherwise, processing continues at Block 205 which uses existing protocols to try to discover an IP address assignment service, such as a DHCP or SLP server, and request the assignment of an IP address to the local system. Block 210 tests whether the foregoing operation was successful. If it was, Block 230 assigns the provided address to the local system. Following operation of Block 230, Block 235 sets the "Administered Address" indicator defined according to the present invention. Thereafter control passes to the end block, and the processing of the logic of FIG. 2 is complete.

If the test in Block 210 has a negative result, the device may try to self-assign an address using methods that are known in the art. Blocks 215 through 220 represent an example of a known technique. In Block 215 the device selects an IP address for itself that it believes is not in use on the local subnet, from the well-known LINKLOCAL subnet (169.254/16). In Block 220 the device uses a protocol such as the Address Resolution Protocol (ARP) to attempt to discover if any other devices in the local area have a prior claim on that address. Block 225 then tests whether the chosen address is available. If not, control returns to Block 215 where a different trial address is chosen and tested. If Block 225 has a positive result, then the device will use the chosen address as indicated at Block 240. Block 245 then sets the "Self-Assigned Address" indicator defined according to the present invention, and control passes to the end block.

Figure 3:
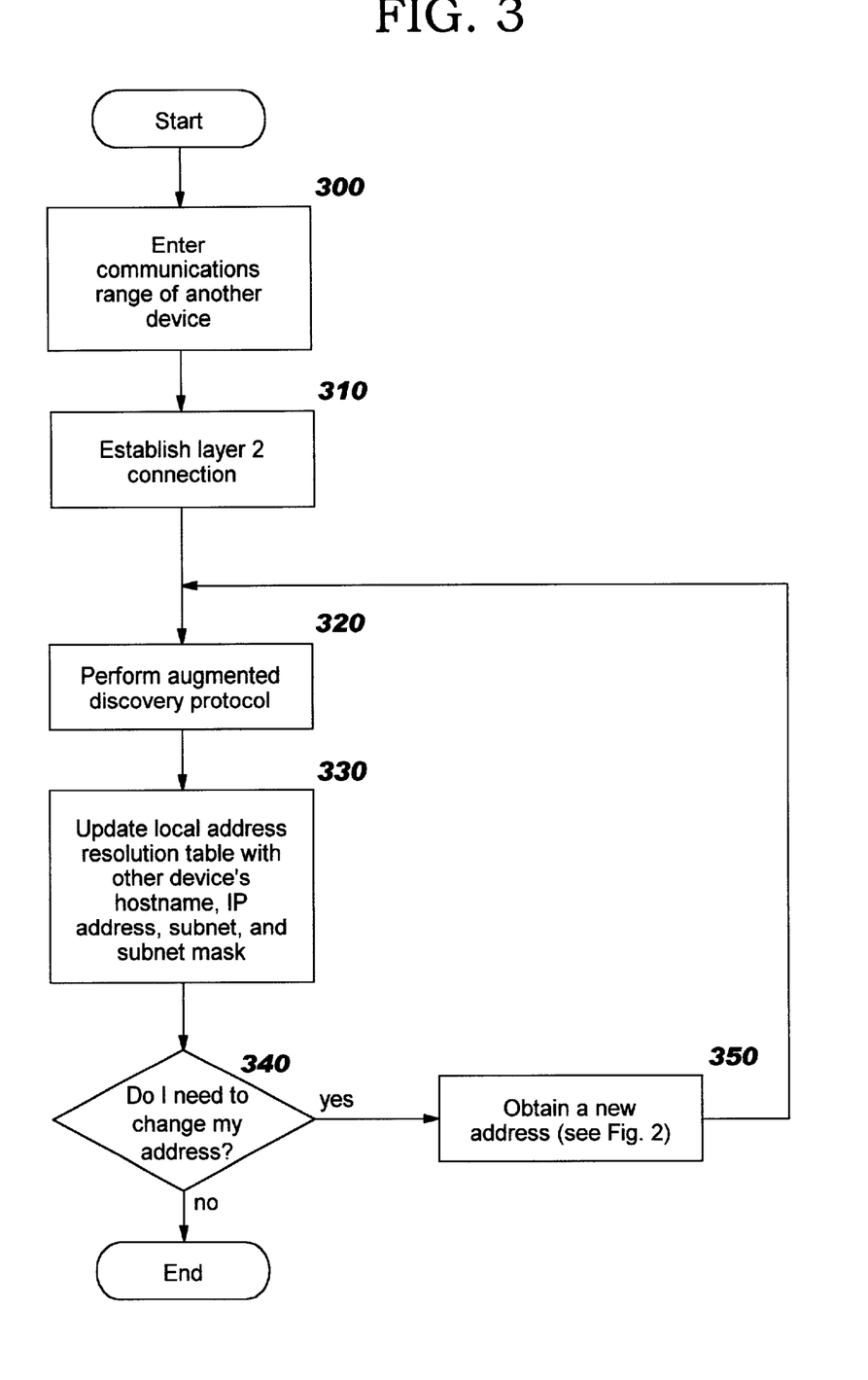
FIG. 3 shows the preferred embodiment of the logic executed at a wireless device when the device comes into communications range with another wireless device.

The processing of FIG. 3 is executed when a device enters the communications range of another device, as indicated in Block 300. (Methods of proximity detection vary, and do not form part of the present invention. For a Bluetooth-enabled device, detection may include performing periodic Inquiry or Inquiry-Scan protocols, paging a known device address, and so forth.) Block 310 establishes a layer 2 connection such as a Bluetooth L2CAP connection, if necessary for performing the Block 320 discovery operation.

In Block 320 the local device performs an augmented discovery protocol. An existing discovery protocol is preferably used, where this protocol is augmented according to the present invention by adding additional fields, as previously described. The processing of Block 320 comprises setting the IP host name, IP address, IP subnet and mask fields to the IP addressing information of the local device (if known). (It may happen that a device has no value for one or more of these fields. In that case, the field should be set to a null value or left empty.) If the device's IP address was configured or obtained from an address assignment service, the AA indicator should be set. If the device's IP address was self-assigned, the SAA indicator should be set. Both indicators should be set to zero if the device does not have any IP address assigned at present. (Both indicators set to zero is also an indication of a device lacking support for the present invention.) Note: if any of the aforesaid fields is already present in the discovery message to be augmented, the existing field may be utilized. For example, an IP subnet field is defined for the SDP reply message in the Bluetooth LAN Access Point Profile, and thus creating an additional subnet field to convey the information of the present invention is not necessary.

In Block 320 the device also receives such augmented discovery data, if any, from the partner device during the exchange of the service discovery protocol messages. In Block 330 the device updates its local address table (such as an ARP table, or a routing table, or a "hosts" file or similar data structure) with the partner's address information (and may store the partner's address indicators as well). This creates, in effect, an internal routing table which may enable the local IP stack to resolve a host name provided by a local application to a remote IP address and to a specific layer 2 connection, interface, or device hardware address, in the absence of a DNS server.

After receiving the partner's data, Block 340 checks whether the device's own address remains valid, given the information learned from the partner. There are several conditions where the local IP address may be invalid, such as when it is identical to the partner's IP address or when the local IP address is self-assigned but the partner (either by configuration or by contacting an address assignment service) has an address that is topologically correct for the local subnet in which the wireless devices are currently situated. Other conditions that may be considered invalid may be identified by one skilled in the art. If the result of the Block 340 test is a need to change the local IP address, in Block 350 the logic of FIG. 2 is performed to obtain a new address and control may return to Block 320. If the result of Block 340 is false, the processing of FIG. 3 ends without needing to change the local device's address.

In the event that two devices establish communications, exchange discovery messages, and both have a conflicting self-assigned address, one must change. Inserting an exponential random-backoff delay between Block 340 and Block 350 may benefit performance by reducing the probability that both devices simultaneously try to change their addresses.

Another possibility is that both devices may have administered addresses, each having a different subnet value. This could occur because the first device obtained its valid address from a server when it was in range of subnet A, and the second device obtained its valid address from a server when it was in range of subnet B. As a result of roaming and/or elapsed time, subnets A and B are now possibly merged as a result of newly-created wireless connectivity between the first and second devices. In this situation, one possibility is that the first device will be unable to communicate with the wired network unless it obtains a local subnet B address because the local router does not route data from subnet A (or vice versa). Another possibility is that a new topology has been created whereby both devices are actually within range of routers serving both subnets A and B. A third possibility is that a single physical subnet exists, but has multiple valid subnet addresses due to a renumbering operation that is in process and not yet complete. This ambiguous situation is not handled very well by traditional IP protocols, owing to the difficulty in making an ad-hoc determination as to the correct topology and addressing. It is suggested that IP addresses for wireless devices be assigned using DHCP, with relatively short lease times (i.e. the time period during which an address is valid, before it must be renewed or expire), to reduce the probability of the ambiguous situation described in this paragraph. Another solution is to ensure that any LAN Access Point providing wireless devices access into a wired network have a configured IP address and subnet, AND so indicate by means of the Administered Address indicator and augmented discovery fields, so that roaming devices can match its subnet address and receive data routed to them through the wired network. This invention assists wireless devices in selecting the most appropriate address.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. A computer program product embodied on computer readable media readable by a computing system in a computing environment, for address resolution in an ad-hoc networking environment, comprising:
   computer-readable program code means for sending a first service discovery message from a first device to a second device, wherein said first service discovery message is augmented with Internet Protocol (IP) address information and address source indicators pertaining to said first device, wherein said address source indicators comprise a first indicator which indicates whether an IP address contained within said IP address information was self-assigned and a second indicator which indicates whether said IP address was administratively configured or assigned by an address assignment service;
   computer-readable program code means for receiving sad first service discovery message by said second device;
   computer-readable program code means for storing said IP address information and said address source indicators at said second device; and
   computer-readable program code means for using said IP address information and said address source indicators stored at said second device for communicating from said second device to said first device in said ad-hoc networking environment.

2. The computer program product as claimed in claim 1, further comprising:
   computer-readable program code means for sending a second service discovery message from said second device to said first device, wherein said second service discovery message is augmented with said IP address information and said address source indicators pertaining to said second device;
   computer-readable program code means for receiving said second service discovery message by said first device;
   computer-readable program code means for storing said IP address information and said address source indicators at said first device; and
   computer-readable program code means for using said IP address information and said address source indicators stored at said first device for communicating from said first device to said second device in said ad-hoc networking environment.

3. The computer program product as claimed in claim 1, wherein:
   said IP address information comprises: an IP host name, said IP address, an IP subnetwork address, and an IP subnetwork mask.

4. The computer program product as claimed in claim 1, further comprising:
   computer-readable program code means for comparing a remote IP address from said received IP address information to a local IP address of said second device to determine whether said local IP address needs to be changed; and
   computer-readable program code means for changing, based upon a result of said computer-readable program code means for comparing, said local IP address.

5. The computer program product as claimed in claim 1, wherein said first service discovery message is a Bluetooth Service Discovery Protocol message.

6. The computer program product as claimed in claim 2, wherein said second service discovery message is a Bluetooth Service Discovery Protocol message.

7. The computer program product as claimed in claim 1, wherein said first service discovery message is a Service Location Protocol message.

8. The computer program product as claimed in claim 2, wherein said second service discovery message is a Service Location Protocol message.

9. The computer program product as claimed in claim 1, wherein said first service discovery message is a Simple Service Discovery Protocol message.

10. The computer program product as claimed in claim 2, wherein said second service discovery message is a Simple Service Discovery Protocol message.

11. A computer program product embodied on computer readable media readable by a computing system in a computing environment, for address resolution in an ad-hoc networking environment, comprising:

computer-readable program code means for sending an inquiry message from a first device to a second device;

computer-readable program code means for receiving said inquiry message by said second device;

computer-readable program code means for sending an inquiry response message from said second device to said first device, wherein said inquiry response message is augmented with address source indicators pertaining to said second device, said address source indicators comprising a first indicator which indicates whether an IP address of said second device was self-assigned and a second indicator which indicates whether said IP address was administratively configured or assigned by an address assignment service;

computer-readable program code means for receiving said inquiry response message by said first device;

computer-readable program code means for sending IP address information pertaining to said second device from said second device to said first device, wherein said IP address information includes said IP address of said second device;

computer-readable program code means for receiving said IP address information by said first device;

computer-readable program code means for storing said address source indicators at said first device;

computer-readable program code means for storing said IP address information at said first device; and computer-readable program code means for using said IP address information and said address source indicators stored at said first device for communicating from said first device to said second device in said ad-hoc networking environment.

12. The computer program product as claimed in claim 11, wherein:

said IP address information comprises: an IP host name, said IP address, an IP subnetwork address, and an IP subnetwork mask; and said IP address information is communicated in said inquiry response message.

13. The computer program product as claimed in claim 11, wherein:

said IP address information comprises: an IP host name, said IP address, an IP subnetwork address, and an IP subnetwork mask; and said IP address information is communicated in a message distinct from said inquiry response message.

14. A system for address resolution in an ad-hoc networking environment, comprising:

means for sending a first service discovery message from a first device to a second device, wherein said first service discovery message is augmented with Internet Protocol (IP) address information and address source indicators pertaining to said first device, wherein said address source indicators comprise a first indicator which indicates whether an IP address contained within said IP address information was self-assigned and a second indicator which indicates whether said IP address was administratively configured or assigned by an address assignment service;

means for receiving said first service discovery message by said second device;

means for storing said IP address information and said address source indicators at said second device; and means for using said IP address information and said address source indicators stored at said second device for communicating from said second device to said first device in said ad-hoc networking environment.

15. The system as claimed in claim 14, further comprising:

means for sending a second service discovery message from said second device to said first device, wherein said second service discovery message is augmented with said IP address information and said address source indicators pertaining to said second device;

means for receiving said second service discovery message by said first device;

means for storing said IP address information and said address source indicators at said first device; and means for using said IP address information and said address source indicators stored at said first device for communicating from said first device to said second device in said ad-hoc networking environment.

16. The system as claimed in claim 14, wherein:

said IP address information comprises: an IP host name, said IP address, an IP subnetwork address, and an IP subnetwork mask.

17. The system as claimed in claim 14, further comprising:

means for comparing a remote IP address from said received IP address information to a local IP address of said second device to determine whether said local IP address needs to be changed; and means for changing, based upon a result of said means for comparing, said local IP address.

18. The system as claimed in claim 14, wherein said first service discovery message is a Bluetooth Service Discovery Protocol message.

19. The system as claimed in claim 15, wherein said second service discovery message is a Bluetooth Service Discovery Protocol message.

20. The system as claimed in claim 14, wherein said first service discovery message is a Service Location Protocol message.

21. The system as claimed in claim 15, wherein said second service discovery message is a Service Location Protocol message.

22. The system as claimed in claim 14, wherein said first service discovery message is a Simple Service Discovery Protocol message.

23. The system as claimed in claim 15, wherein said second service discovery message is a Simple Service Discovery Protocol message.

24. A system for address resolution in an ad-hoc networking environment, comprising:

means for sending an inquiry message from a first device to a second device;

means for receiving said inquiry message by said second device;

means for sending an inquiry response message from said second device to said first device, wherein said inquiry response message is augmented with address source indicators pertaining to said second device, said address source indicators comprising a first indicator which indicates whether an IP address of said second device was self-assigned and a second indicator which indicates whether said IP address was administratively configured or assigned by an address assignment service;

means for receiving said inquiry response message by said first device;

means for sending IP address information pertaining to said second device from said second device to said first device, wherein said IP address information includes said IP address of said second device;

means for receiving said IP address information by said first device;

means for storing said address souse indicators at said first device;

means for storing said IP address information at said first device; and means for using said IP address information and said address source indicators stored at said first device for communicating from said first device to said second device in said ad-hoc networking environment.

25. The system as claimed in claim 24, wherein:

said IP address information comprises: an IP host name, said IP address, an IP subnetwork address, and an IP subnetwork mask; and said IP address information is communicated in said inquiry response message.

26. The system as claimed in claim 24, wherein:

said IP address information comprises: an IP host name, said IP address, an IP subnetwork address, and an IP subnetwork mask; and said IP address information is communicated in a message distinct from said inquiry response message.

27. A method for address resolution in an ad-hoc networking environment, comprising the steps of:

sending a first service discovery message from a first device to a second device, wherein said first service discovery message is augmented with Internet Protocol (IP) address information and address source indicators pertaining to said first device, wherein said address source indicators comprise a first indicator which indicates whether an IP address contained within said IP address information was self-assigned and a second indicator which indicates whether said IP address was administratively configured or assigned by an address assignment service;

receiving said first service discovery message by said second device;

storing said IP address information and said address source indicators at said second device; and using said IP address information and said address source indicators stored at said second device for communicating from said second device to said first device in said ad-hoc networking environment.

28. The method as claimed in claim 27, further comprising the steps of:

sending a second service discovery message from said second device to said first device, wherein said second service discovery message is augmented with said IP address information and said address source indicators pertaining to said second device;

receiving said second service discovery message by said first device;

storing said IP address information and said address source indicators at said first device; and using said IP address information and said address source indicators stored at said first device for communicating from said first device to said second device in said ad-hoc networking environment.

29. The method as claimed in claim 27, wherein:

said IP address information comprises: an IP host name, said IP address, an IP subnetwork address, and an IP subnetwork mask.

30. The method as claimed in claim 27, further comprising the steps of:

comparing a remote IP address from said received IP address information to a local IP address of said second device to determine whether said local IP address needs to be changed; and changing, based upon a result of said comparing step, said local IP address.

31. The method as claimed in claim 27, wherein said first service discovery message is a Bluetooth Service Discovery Protocol message.

32. The method as claimed in claim 28, wherein said second service discovery message is a Bluetooth Service Discovery Protocol message.

33. The method as claimed in claim 27, wherein said first service discovery message is a Service Location Protocol message.

34. The method as claimed in claim 28, wherein said second service discovery message is a Service Location Protocol message.

35. The system as claimed in claim 27, wherein said first service discovery message is a Simple Service Discovery Protocol message.

36. The system as claimed in claim 28, wherein said second service discovery message is a Simple Service Discovery Protocol message.

37. A method for address resolution in an ad-hoc networking environment, comprising the steps of:

sending an inquiry message from a first device to a second device;

receiving said inquiry message by said second device;

sending an inquiry response message from said second device to said first device, wherein said inquiry response message is augmented with address source indicators pertaining to said second device, said address source indicators comprising a first indicator which indicates whether an IP address of said second device was self-assigned and a second indicator which indicates whether said IP address was administratively configured or assigned by an address assignment service;

receiving said inquiry response message by said first device;

sending IP address information pertaining to said second device from said second device to said first device, wherein said IP address information includes said IP address of said second device;

receiving said IP address information by said first device;

storing said address source indicators at said first device;

storing said IP address information at said first device; and using said IP address information and said address source indicators stored at said first device for communicating from said first device to said second device in said ad-hoc networking environment.

38. The method as claimed in claim 37, wherein:

said IP address information comprises: an IP host name, said IP address, an IP subnetwork address, and an IP subnetwork mask; and said IP address information is communicated in said inquiry response message.

39. The method as claimed in claim 37, wherein:

said IP address information comprises: an IP host name, said IP address, an IP subnetwork address, and an IP subnetwork mask; and said IP address information is communicated in a message distinct from said inquiry response message.

* * * * *